United States Patent [19]

Kent et al.

[11] 4,168,885
[45] Sep. 25, 1979

[54] COMPATIBLE 3-DIMENSIONAL MOTION PICTURE PROJECTION SYSTEM

[75] Inventors: Arthur P. Kent; Mortimer Marks, both of New York, N.Y.

[73] Assignee: Marks Polarized Corporation, Whitestone, N.Y.

[21] Appl. No.: 764,447

[22] Filed: Jan. 31, 1977

Related U.S. Application Data

[63] Continuation-in-part of Ser. No. 524,798, Nov. 18, 1974, Pat. No. 4,017,166, which is a continuation-in-part of Ser. No. 329,733, Feb. 5, 1973, Pat. No. 3,851,955.

[51] Int. Cl.² .................. G03B 21/00; G03B 35/00
[52] U.S. Cl. ............................ 352/129; 352/57; 352/60; 352/86; 352/239
[58] Field of Search ............... 352/57, 60, 86, 239, 352/129

[56] References Cited

U.S. PATENT DOCUMENTS

| | | | |
|---|---|---|---|
| 1,944,024 | 1/1934 | Foster | 352/92 |
| 1,966,503 | 7/1934 | Hunter | 352/239 |
| 2,268,338 | 12/1941 | Kober | 352/57 |
| 2,329,294 | 9/1943 | Ramsdell | 352/57 |
| 2,683,389 | 7/1954 | Wright | 352/86 |
| 3,189,915 | 6/1965 | Tondreau | 352/60 |
| 3,339,998 | 9/1967 | Hoch | 352/57 |
| 3,537,782 | 11/1970 | Craig | 352/86 |
| 3,551,036 | 12/1970 | Bielusici | 352/60 |

*Primary Examiner*—Monroe H. Hayes

[57] ABSTRACT

Stereo pairs suitable for motion picture projection are derived from conventionally taken motion picture film by selection of frames and rearrangement thereof in side by side relationship upon a continuous strip of motion picture film. The pairs so prepared may be incorporated into film containing conventionally photographed stereo frames to provide a compatible system for 3-dimensional motion picture projection.

1 Claim, 6 Drawing Figures

COMPATIBLE 3-DIMENSIONAL MOTION PICTURE PROJECTION SYSTEM

This is a Continuation in Part of application No. 524,798 filed Nov. 18, 1974 now U.S. Pat. No. 4,017,166, which was continuation in part of Ser. No. 329,733 filed Feb. 5, 1973, now U.S. Pat. No. 3,851,955.

DEFINITIONS

The term "time delay 3-D" as used herein relates to means and a method for creating apparent stereoscopic-viewing effects from motion picture film which has been taken by conventional apparatus.

"Monocular camera" means a camera using a single lens for photographing a scene.

"Interocular spacing" means the distance between vantage points from which a scene is photographed to produce stereo pairs.

BACKGROUND OF THE DISCLOSURE

Stereoscopic motion pictures have been displayed by simultaneously projecting overlapped right and left stereo images upon a screen through mutually extinguishing filters. The filters employed were colored filters such as red and green, or light polarizing filters disposed with their planes of polarization normal to each other.

Prior art devices for the projection of 3-D motion pictures used two projectors each having its own film strip and polarizer to project stereo images upon the screen, one projector having the film for right eye images and the other for left eye images. In the two projector systems, the images were difficult to synchronize, adjustment of the position of the overlapped images was time consuming and the image light intensities were frequently out of balance. Such systems also necessitated the additional expenses of twice as much film as standard motion pictures, extra handling in the projection booth, frequent monitoring, etc.

It has also been proposed to print left and right motion picture stereo pictures on a single film frame and to project them simultaneously using a single projector. Such stereo pictures may be printed side by side upon the film or one above the other. Mirrors and other optical devices have been employed to overlap the two images on the screen. These prior art optical devices, however, had substantial light loss resulting in lowered intensity of the projected images; were difficult to adjust, and required substantial modification of the standard motion picture projector.

It is an object of the invention to provide an improved 3-dimensional motion picture projection system.

Another object is to produce 3-dimensional displays from motion picture film that has been taken by conventional cameras, i.e., monocular cameras.

A further object is to achieve the foregoing objects with a structure of relative simplicity.

A specific object is to meet the above objects using conventional motion picture projection apparatus with relatively little modification.

A general object is to provide a relatively inexpensive optical device which is attached to existing projection equipment.

A further object is to utilize existing inventories of conventional film to create stereoscopic viewing effects, thereby enhancing the value of these film inventories.

It is a further object of the present invention to provide a stereo conversion system for standard motion picture projectors which will permit the projection of stereoscopic images from a single film strip with little light loss and a minimum of inconvenience and modification of the projector.

A further object of the present invention is to provide a compact, easily adjusted stereo conversion device for standard motion picture projectors, adaptable to the range of projection lenses of different foci, for the ranges of throw distance and screen sizes usually encountered in motion picture theaters.

Still another object of the present invention is to eliminate the distracting fringe images at the edges of the projected stereo images superimposed upon a screen.

A further object is to provide a single film strip containing single frames having conventional stereo or time delay stereo in any combination.

A further object is to provide a viewing device for editing conventional film strip taken with a monocular camera, for the purpose of selecting the best combination of stereo pairs from a given scene.

Other objects and various further features of novelty and invention will be apparent to those skilled in the art from a reading of the following specification in conjunction with the accompanying drawings. In said drawings which show, for illustrative purposes only, preferred forms and techniques of the invention:

DESCRIPTION OF THE DRAWINGS

In the accompanying drawings forming part hereof, corresponding parts have been given the same reference numerals, in which drawings.

SUMMARY OF THE DISCLOSURE

Figure 1:
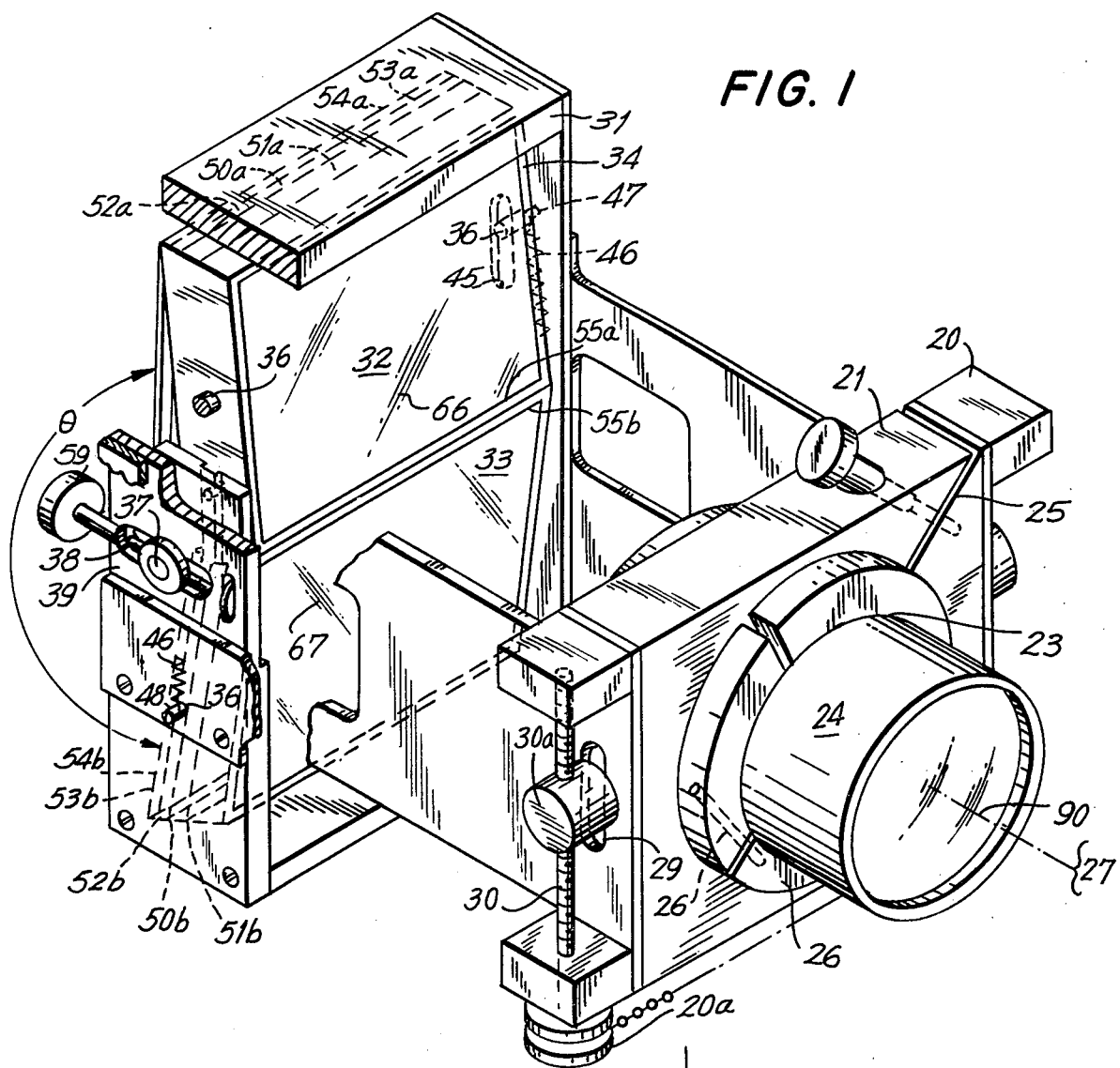
FIG. 1 is a somewhat isometric view, partly broken away, of the projector attachment assembly of the present invention.

Time Delay 3-D is obtained if a scene sequence includes successive frames in which the subject and background move horizontally with respect to each other and if the first viewing eye is made to track successive frames while the second viewing eye is made to track the same succession of frames but in a frame-displaced relation to the frames viewed by the first eye.

This invention deals with the use of light polarizing techniques or mutually extinguishing polarizers or filters to achieve the projection of left and right images from conventional stereo pairs or time delay stereo pairs upon a screen. The projected images may then be observed through a similar set of filters. The time delay stereo pairs are created by the controlled digital displacement of frames from a monocular single film strip.

The invention utilizes a conventional motion picture projector, a novel optical device, and conventional single strip motion picture film having stereo pairs taken from selected portions of conventional cinematographic film specially printed onto signal frames to project 3-dimensional motion pictures. The stereo pairs on each single frame are simultaneously illuminated, and projected on axes which converge in overlapping relationship in substantial registration at a screen which reflects polarized images to the viewers in the audience. The rays from the stereo images are polarized mutually at right angles. The screen is viewed through "spectacle" viewers having filters polarized mutually at right angles for the left and right eye, in accordance with the respective polarizations of the two sets of polarized rays from the image pairs.

One embodiment of the present invention utilizes an optical "converter". A housing is secured to the projection lens of a standard motion picture projector. The projector is supplied with a motion picture film having a series of abutting stereo pairs thereon separated by a dark bar. Light from the stereo pairs is directed through two prisms carried by the housing. The prisms are adjustably mounted to enable the stereo pairs to be brought into overlapping relationship upon a theater screen. Light polarizing filters are incorporated within each of the prisms with their planes of polarization at 90° with respect to each other. The prisms are disposed within the housing in close proximity to each other and abutting along one margin.

To accommodate the prism assembly to various screen throw distances and screen sizes, the conventional projection lens is supplemented or replaced by a zoom lens, whereby focus may be established on overlapped images precisely positioned on the screen.

The film is printed with an opaque band between the stereo pairs of a single frame. When the pairs overlap, the opaque band forms a sharp dark edge for the image, as in conventional projection. The meeting edges of the prisms in front of the projector are masked by the opaque band.

The present invention solves the prior art difficulties with time delay stereo, as follows:

1. A standard motion picture projector with a standard single frame aperture or "gate" is used with no modification except for the added converter, as described herein and in our co-pending application, Ser. No. 329,733, filed Feb. 5, 1973, now U.S. Pat. No. 3,851,955.
2. Time delay 3-D is created by an editing procedure which provides a variable integral retarded or advanced frame differential in the printing (0, ±1, ±2, etc.). When the predominant direction of motion changes from left to right, or vice versa, the frames are advanced or retarded as required, as determined by viewing and editing the standard single strip film. The editing may be done by projecting motion pictures from two identical synchronized film strips, overlapping, polarizing and viewing them with polarized spectacle viewers; and indicating by a marking of the film edge or other suitable manner the preferred integral advanced or retarded film differential of the film frames (3, 2, 1, 0, −1, −2, −3). Usually ±1 or ±2 is best.

When the motion is very rapid and time with even one frame differential is used, an unpleasant effect occurs which may be described as a jerky or periodically interrupted motion or "tearing". The "tearing effect" obtained with rapid motion is avoided by using zero differential between frames; that is, printing the identical frame twice. This will momentarily cancel the 3-D effect which is usually not apparent when high speed motion is present. When the high speed motion ceases, then the differential integral frame spacing is resumed, and the 3-D effect reappears.

3. An edited time delay system, using two images on a single frame, one above the other, and a dark bar separating the images. These images are uniformly reduced, or anamorphically squeezed. Time delay or conventional stereo image pairs are used alone, or in combination.

GENERAL DESCRIPTION

Referring to the drawings and particularly to FIG. 1, there is shown a stereo projection converter 20 for attachment to a standard motion picture projector. The converter is carried with a substantially "T" shaped housing having a lens attachment block 21 at the rear or projector end thereof and a prism assembly 22 at the front.

The lens attachment block 21 is preferably rectangular and centrally bored as indicated at 23 to receive a lens 24 therethrough. The block 21 is of substantial thickness to provide a good bearing surface for the lens 24. A slit 25 is cut through the block 21 from its periphery to the bore 23. The block is also bored and threaded to receive a tightening screw 26 by means of which the block 21 may be firmly secured to the lens 24.

The lens 24 may be the lens of a motion picture projector (not shown) or an auxiliary lens 24a, as hereinafter more fully described, which in turn is secured to the projector lens. A split collar 28 may be used around the lens 24 to positively establish the longitudinal position of the block 21 upon the lens 24.

The housing 20 is vertically adjustable with respect to the block 21 and the optical axis of the projector lens system by a means of a chain and pulley drive 20a, the slot 29 in the housing and the adjusting screw 30 and traveller 30a which extends through the slot and is threaded into the block 21. One slot 29, adjusting screw 30 and traveller 30a are provided on each side of the housing 20.

The front of the housing 20 is in the form of a rectangular frame 31 within which two prisms 32, 33 are swingably carried. Each of the prisms are secured within holders 34, 35 which extend around the prism margins. Short, outwardly extending stub shafts 36 are carried by the prism holders 34, 35 on each side thereof. The stub shafts 36 are received by the frame 31 and provide pivots upon which the prisms can swing.

Figure 2:
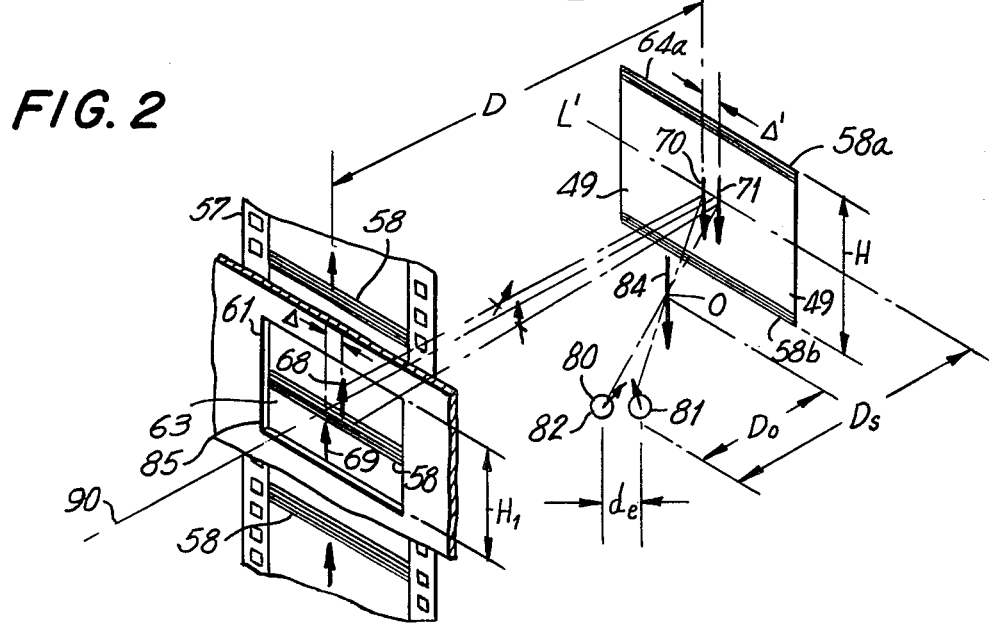
FIG. 2 is a diagrammatic view in side elevation showing a stereo pair projected and overlapped upon a screen by a standard motion picture projector and the projection device of the present invention. The film pairs are shown in the gate aperture of the projector, and rays are traced from each stereo image to show the overlapping of these images upon the screen.

As shown in FIG. 1, the prisms 32, 33 are disposed in abutting relationship with their inner margins touching. In the embodiment illustrated, the prisms are oriented for use with a single strip film in which the stereo pairs are disposed one above the other as shown in FIG. 2. It is within the purview of the present invention, however, to employ single strip stereo film in which the stereo pairs are laterally disposed, in which event the housing 20 and the prisms 32, 33 would be rotated 90° from the position shown in FIG. 1.

Each of the prism holders 34, 35 is provided with a small, outwardly extending pin 37 between one of its stub shafts 36 and the margin of the holder which contacts the other prism holder. The pins 37 are received within the elongated slots 38 of a small flat block 39. The block 39 is carried between the inner surface of the frame 31 and the outer faces of the prism holders 34, 35. As the knob 59 on the control member 43 is rotated, the block 39 moves and the pins 37 are urged either toward or away from the projector 27, depending upon the direction of travel. Movement of the pins 37 results in a corresponding movement of the prism holders, and consequently the prisms, upon the shafts 36. In this manner, the prisms can be swung so as to bring the images projected through them into overlapping relationship upon the screen.

Since the prisms 32, 33 have a certain amount of thickness and the prism holders 34, 35 embrace the prisms, it will be apparent that some movement relative to each other must be provided. Also, the prisms must be held in contact with one another along their inner margins and in line with the optical axis of the system to prevent projection problems.

FIG. 1 shows that the stub shafts 36 of the upper prism holder 34 are received within an elongated slot 45 in the frame 31. A coil spring 46 is secured at one end to a reduced diameter portion 47 of the stub shafts 36 and at its opposite end to a reduced portion 48 of the stub shaft 36 on the lower prism holder. The spring 46 is loaded so as to urge the prisms together at all times. In order to prevent skewing, the same spring arrangement is provided on each side of the frame 31.

As the prism holders are swung by the control knob 59 in bringing the images into overlapping relationship upon the screen 49, the upper prism holder 34 and its prism 32 can move upwardly or downwardly depending upon the direction of travel without separating the prisms.

To fill the screen 49 with the stereo pairs, which are each somewhat less than one-half the size of the standard frame, projected in overlapping relationship, it is necessary to interpose a shorter focus lens or a zoom (vari-focal) lens 24 between the projector lens 56 (not shown) and the prisms 32, 33, or substitute a zoom lens for the projector lens. The lens attachment block 21 is suited for this purpose. It is also within the purview of the present invention to take the stereo pictures through an anamorphic camera lens and thereafter project them through an anamorphic lens, such as a cinemascope lens, well-known in the art.

A horizontal obstruction is formed across the projected light beam by the abutting edges 55a, 55b of the prism holders 34, 35. Further, the stereo pairs if abutted directly (without the dark bar 58 shown in FIG. 2), display additional images on the edges of the screen at the top and bottom. These side images were previously masked at the screen by the dark border, or at the booth by dark strips on its window, neither method being effective, and leading to fuzzy edges, or residual faint images. It has been found that both of these problems can be overcome, however, by printing the stereo pairs on the film in the manner shown in FIG. 1, in which the film 57 used in the present invention has a series of stereo pairs LR, L'R', L"R", separated by an opaque band 58. The opaque band is about 1 to 2 mm wide or 6% to 12% of the full aperture or total frame width and serves to mask the horizontal line formed by the abutting edges of the prism frames 34, 35. As shown in FIG. 1, when the stereo pairs are projected, the opaque band 58 appears as sharp dark borders 58a, 58b at the top and bottom of the image, thus eliminating the fuzzy edges or residual images which would otherwise be present.

In FIG. 2, there is shown diagrammatically a complete optical system according to the present invention with the optical lenses and devices removed for simplification. A conventional film frame 61 modified according to this invention for stereo projection is shown at the left. The film frame 61 comprises a pair of images 62 and 63 one above the other arranged with a horizontal opaque bar 58 between them. A standard projection lens (not shown) focused at a distance q from the film plane projects an image at a throw distance D to a screen having a height H. A conventional film frame 61 has a height $h = 18.8$ mm and in projection this is magnified to the screen height H. However, for the purposes of this invention, the projector lens is selected to have a focal length such that the actual projection height is about 10% more than 2 H. If projected without the converter of the present invention, the film frame 62 would appear as the lower projected image, and the film frames 63 would appear as the upper projected image with a combined projected height of about 2.2 H. The prism assembly, however, brings the frames 62, 63 into overlapping relationship upon the screen with a projected height of H; the extra 0.2 H being used as an 0.1 H sharply defined dark border at the top and bottom of the projected images on the screen.

To produce the stereo effect, the stereo images indicated by the arrows 68 and 69 on film frames 62 and 63, respectively, are laterally displaced by a distance $\delta$ which is approximately inversely proportional to the distance of the object to the camera lens (not shown) assuming objects at infinity distance have a displacement $\delta = 0$. The arrow 68 appears on the screen as the arrow 70 and the arrow 69 appears on the screen as the arrow 71. The images 70 and 71 on the screen are laterally displaced by a distance $\Delta'$.

As disclosed above, the converter 22 not only brings the image of the frames 62, 63 into overlapping relationship upon the screen but also polarizes the projected images so that their respective planes of polarization are at 90° to each other. This feature is indicated by the diagonal lines 66, 67 on the prisms 32, 33 which crisscross on the screen 49. It is now apparent that the opaque or dark bar 58 appears on the upper and lower edges of the screen 49 as sharp dark lines 58 and 58, which effectively frames the images at these edges. If the dark line were too narrow or nonexistent, portions of the overlapped images would appear along the edges and produce an undesirable distracting fringe.

The functioning of the device may be understood by the following: displaced stereo images indicated by the arrows 68 and 69 are projected upon the screen 49 as overlapped image pairs, 70 and 71. In projection, the image 70 is polarized at +45° and the image 71 is polarized at +135° and these images correspond to the right and left eye images, respectively. The viewer wears polarized spectacles 80 having a right eye lens 81 polarized at +135° and a left eye lens 82 polarized at +45°. Thus, the left eye lens will admit only the upper image 70 and the right eye lens will admit only the lower image 71 on the film.

Since the images are displaced at the screen, the line of sight of these images crosses over in front of the screen plane at point 83 and the two arrows 68 and 69 are seen as a single object indicated by the arrow 84 which passes through point 83 at a distance d in front of the screen 49. The displacement of arrows 68 and 69 at the screen is Δ. The interocular distance between the observer's eyes is "a" and d is the apparent distance of the object 84 from the screen 49.

The optical axis 90 through the prism and lens assembly bisects the angle θ, which is the angle between the front surfaces of the prisms. This angle θ is adjusted to control the vertical displacement of the overlapped image pairs into precise alignment.

To convert a standard motion picture projector to a stereoscopic projector employing the above described apparatus, it is merely necessary to attach the converter to the projection lens (not shown) of the projector by slipping it into the lens attachment block 21 or by coupling the lens 24 to the wide angle or zoom lens. Thereafter, with the new stereo film 57 threaded through the projector in operation, the control knob 59 is turned to bring the projected stereo pairs into alignment on the screen. When viewed through spectacles 80 having lenses of light polarizing material disposed with their planes of polarization normal to each other, the projected images will appear three dimensional.

In FIG. 2, the invention is shown diagrammatically in application to a standard motion picture projector having light source on a primary projection axis 90. A standard film gate 85 has an opening symmetrically astride the axis 90. The drive means of the standard projector is utilized for conventional single frame indexing of the film 57 and for coordinated drive of a rotary shutter (not shown). Thus, for each indexed position of the film 57, two adjacent time delay stereo pair images 62 and 63 or conventional stereo pair images will be positioned in the gate opening, preferably one frame above the other with a dark bar separating the stereo image pairs.

For motion from left to right the image appears at a plane nearer the viewer than the screen, i.e., apparently in front of the screen. For the same polarizations without retardation the effect is reversed for subject motion from right to left, and the subject appears to move behind the plane of the screen. The depth illusion is at its maximum, for the indicated polarizations, if the film were concerned with traffic crossing the field from right to left in the foreground, and with other traffic crossing the field from left to right behind the foreground.

In accordance with a feature of the invention, provision is made for reversing the stereo pairs, that is advancing or retarding the image pair in the projection system so that an effective depth illusion will be sensed by the viewer through spectacles 80, for primary subject matter motion crossing the field horizontally from left to right, or vice versa.

We prefer that the film 57 be pre-edited, specifically to identify those sequences in which the movement of foreground objects relative to background objects occurs right to left, apart from those sequences in which such motion is left to right, and to thereafter appropriately print these images, advanced or retarded according to the relative velocity of the foreground and background objects.

Figure 3:
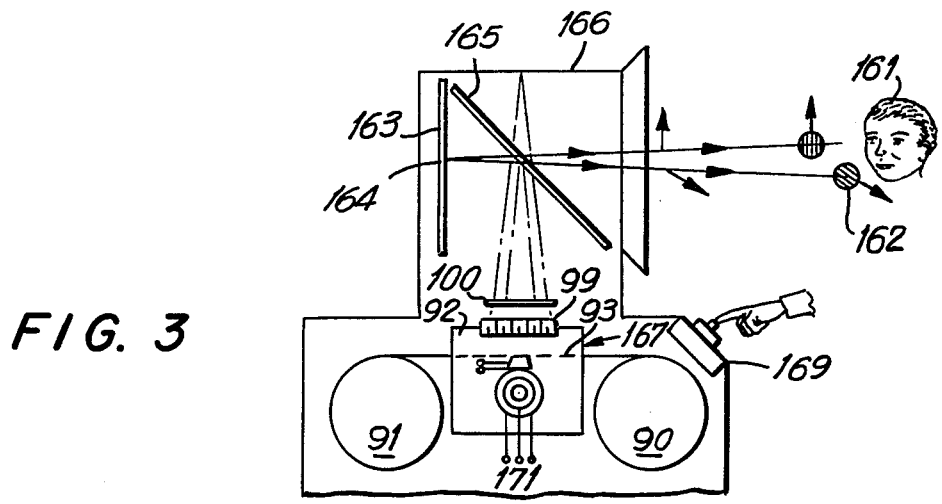
FIG. 3 shows a side view of a device for viewing 3-dimensional motion pictures in time delay, including means for selecting appropriate image pairs from a single strip film.

Referring now to FIG. 3, there is shown a side view section of a device for viewing 3-dimensional motion pictures in time delay from single strip film with control means for selecting the preferred image pairs from the single strip film in accordance with the motion of the subject matter photographed on the said single film strip. In the drawing, 90 and 91 are reels of motion picture film which pass through the optical device, generally indicated as 92, and shown in detail in FIG. 4. The function of the device is to project selected image pairs from the single film strip 93 through the multiple projection lenses 94, 95, 96, 97, and 98; generally indicated in FIG. 3 as 99.

Figure 4:
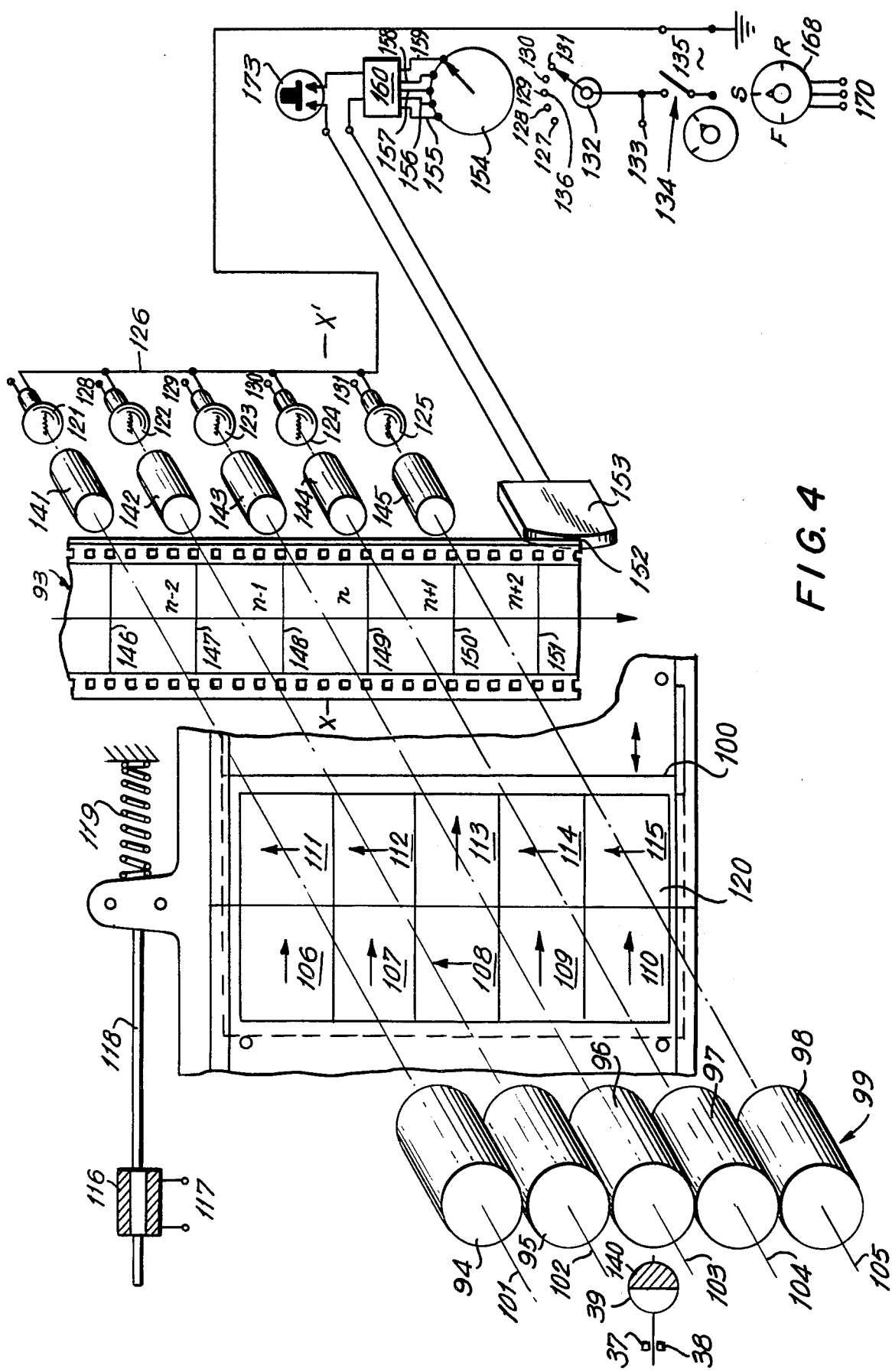
FIG. 4 shows an isometric diagrammatic view of an optical sub-assembly of the device shown in FIG. 3.

In FIG. 4, the optical system is shown in an isometric diagram. The single conventional film strip 93 has a succession of images n−2, n−1, n, n+1, and n+2. Each of these five frames has corresponding optical axes, 101, 102, 103, 104, and 105. A frame 100 contains 10 polarizing filters indicated generally as 106 through 115, inclusive with the directions of polarization as indicated by the arrows within each filter. The entire frame 100 may be moved back and forth parallel to the XX' axis by an electromagnet 116. Electrically activating the electromagnet 116 via terminals 117 causes the rod 118 to move to the right against the spring 119 and the filters 106 through 110 inclusive are moved into position within the slit aperture, 120. When the electromagnet is deactivated, the spring 119 causes the frame 100 to move to the left and the filters 111 through 115, inclusive are then positioned in the slit aperture 120.

In the diagram, independent illuminating means, for example, filament electric light bulbs 121 through 125 inclusive are connected to a common grounded lead 126 and the other leads 127 through 131, inclusive, are connected respectively to the terminals bearing the same numbers on the rotary selector switch 132, with the exception of 129, which is connected to the common terminal 133 and the rotary selector switch 132. An "on-off" switch 134, provides power to the entire system from the power line input connection 135. The central position 136 on the selector switch 132 is connected to another electromagnet 137 via its terminals 138. The function of the electromagnet 137 is to insert or remove a depolarizing filter 139 from the light being projected by the lens 96. In lieu of the depolarizing filter, a halfwave plate 140 in the form of a semicircle intercepts half of the light emitted by the lens 96 so as to effectively mix the polarized rays at 90° to each other thereby depolarizing the output light. When the filter 139 is removed from the path of the light projected from lens 96 the light is again polarized in accordance with the direction of polarization of filters 108 or 113.

A mechanism similar to that shown in connection with 116, 118 and 119 may be employed to move the filter in and out of the light path. The light emitted from the light sources 121 through 125 inclusive are columnated by condensing lenses 141 through 145 inclusive individually illuminates corresponding film strips n−2 to n+2, respectively. Each film strip is shielded by filter strips 146 through 151 inclusive, so that the light from neighboring sources will not spill over onto adjacent frames. The film strip 93 may have a magnetic stripe 152 which may be marked by a magnetic recording head 153 with the signals of different frequencies suitable for specifying the choice of particular pairs of frames. The selector switch 132 has a second tier of connectors 154 having terminals 155 through 159 inclusive leading to electronic filter circuits 160 for selecting different frequencies to be impressed electromagnetically via the recording head 153 onto the magnetic stripe 152.

The functioning of the device as shown in FIGS. 3 and 4 may now be understood by the following description: the operator 161 wears polarized viewers 162 for viewing the metallized screen 163 onto which selected image pairs from the film strip are simultaneously projected by a set of two projection lenses selected from the group 94 through 98 inclusive. The optical axes of lenses 94 through 98 inclusive converge to the point 164 on the metallized screen as shown in FIG. 3, after being reflected there by the half-silvered mirror 165. Light transmitted from the half-silvered mirror is absorbed on the blackened upper portion of the view box 166. Light from the metallized screen 163 is then reflected and remains polarized. The image pairs projected on the screen 63 are polarized at right angles and these image pairs are selectively transmitted by the polarized viewers 162 to the right and left eye of the viewer 161. To select an image pair appropriate to a particular scene, the observer causes the film to move forward in the direction shown by the arrow 167 which is accomplished by moving the rotary switch 168 to a position marked "F" (forward). The control switch 168 is on the front control panel 169 and is connected to the motor via terminals 170 and 171, including the power source, not shown. To stop the film, the switch 168 is turned to the position marked "S" and to reverse the motor for rewind, the switch 168 is turned to the position marked "R". For example, film pair n and n−2 are selected and projected by turning the selector switch 132 to position 131 which actuates light source 121, all other sources being dark with the exception of 129, which remains illuminated. The controller 161 may then view the motion picture film action through pairs of filters 111 and 113; whereby the right eye of the observer 161 will see the frame n−2 with vertical polarization, and frame n in the left eye with horizontal polarization. The scene may then be rerun, using the selector switch 132 connected to the terminals 127, 128 or 130, whereupon the pairs of frames appear to the right and left eyes of the viewer respectively as follows: for 128 film pairs n−1 and n; for 127 film pairs n−2 and n; for 130 film pairs n and n+1 and for 131 film pairs n and n+2. For very fast motion, it may be desired to eliminate the time delay because confusion may occur. In such a case, the film strip n is presented twice as it normally may be to the right and left eyes. This occurs when the selector switch 132 is turned to central position 136. In this case, the depolarizing filter 139 is interposed into the light path thus depolarizing the light on the screen and the image n is seen by the right and left eyes simultaneously without stereo effect. Such a condition may be kept relatively short for only those sequences where time delay is unsatifactory as above described.

After viewing a given sequence several times and trying various combinations, as above set forth, the controller then decides upon a particular combination, whereupon he reruns the film strip in that particular combination and impresses the chosen combination upon the magnetic tape by means of pressing the control button 173.

In printing the film, the arrangement shown in FIG. 4 may be again employed. In this case, the projection lens bank 99 is utilized to print pairs of films suitably positioned, and reduced in size upon a single frame so as to appear within the gate, shown as 62 and 63 in FIG. 2. The control signals impressed upon the magnetic tape may be employed to activate the appropriate light source pairs so that the printing may be automatically accomplished with the appropriate image pairs.

TABLE OF SYMBOLS $a$ = distance from optical center of eye lens to retina
$b$ = interocular distance
$d_1$ = distance of image of $O_1$ on the retina of the left eye and right eye from the central Z axis
$d_2$ = distance of image $O_2$ on the retina of the left eye and right eye from the central Z axis
$\Delta d = d_1 - d_2$
$\Delta d' = 2\Delta d$ = total displacement of corresponding image points $O_1$ and $O_2$ on the retina of each eye
N = a number +2, +1, 0, −1, −2, etc.
$V_x$ = velocity of screen image normal to central axis
$R_z$ = depth ratio $\Delta Z/Z$
$Z_1$ = distance from optical center of eye lens to object $O_1$
$Z_2$ = distance from optical center of eye lens to object $O_2$
$Z = (Z_1 Z_2)^{\frac{1}{2}}$.
$\sigma = \tau/b$, constant
$\tau = N\tau_1$ = time delay between selected frames
$\tau_1$ = time delay between successive frames; using $(1/24) = 0.041$ sec. (1 nanometer = $10^{-9}$ meter = 1 nm = 1 millimicron = 1 m$\mu$)

A MATHEMATICAL PHYSICS ANALYSIS OF TIME DELAY 3-D EFFECT

Figure 5:
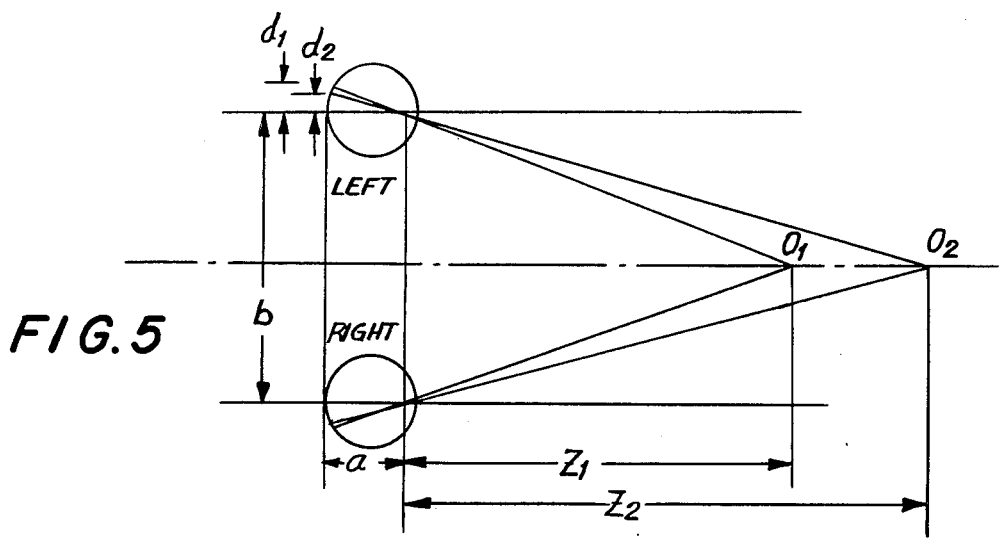
FIG. 5 shows conventional stereo image pair geometry and optical ray paths for right and left eyes.
Figure 6:
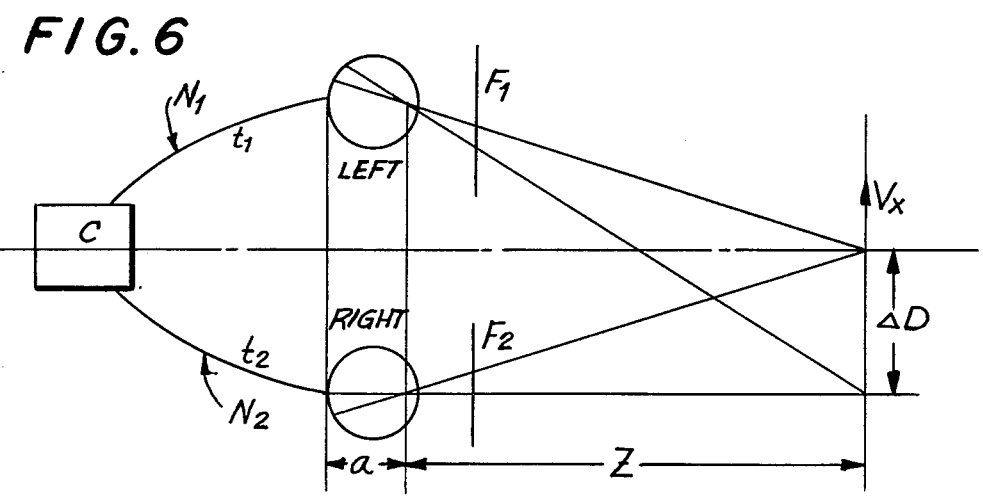
FIG. 6 shows the geometry of stereo pair production utilizing the time delay principle.

In FIG. 5 there is shown normal left and right eyes having an interocular distance b viewing two objects $O_1$ and $O_2$ at distances $Z_1$ and $Z_2$. The distance between the optical center of the lens of the eye to the retina of the eye is a.

The objects $O_1$ and $O_2$ appear on the retina of each eye at distances $d_1$ and $d_2$ respectively from the central optical axis of each eye.

From the geometry of FIG. 5:

$$[d_1/(b/2)] = a/Z_1 \tag{1}$$

$$[d_2/(b/2)] = a/Z_2 \tag{2}$$

$$d_1 = (ab/2)/Z_1 \tag{3}$$

$$d_2 = (ab/2)/Z_2 \tag{4}$$

The total displacement $\Delta d'$ between corresponding image points $O_1$ and $O_2$ on the retinae of the two eyes is:

$$2(d_1 - d_2) = 2\Delta d = ab[(1/Z_1) - (1/Z_2)] \tag{5}$$

$$\Delta d' = ab\Delta Z/Z_1 Z_2 \tag{6}$$

Since $Z^2 = Z_1 Z_2$, then:

$$\Delta d' = ab\Delta Z/Z^2 \tag{7}$$

In the time $\Delta t = \tau$, the images move a distance $\Delta d'$ on both retinae:

$$\Delta d' = V_x(a/Z)\Delta t \tag{8}$$

Where $V_x$ = velocity of image on the screen at distance Z. Solving for $\Delta t = \tau$:

$$\tau = \Delta t = (\Delta d'/a)(Z/V_x) \tag{9}$$

Substituting (7) into (9) and simplifying:

$$\tau = \Delta t = (b/V_x)(\Delta Z/Z) \tag{10}$$

From (10), since $\tau$ and b are constants, the depth ratio $R_z = (\Delta Z/Z)$ can be expressed in terms of the new constant $\sigma = (\tau/b)$:

$$R_z = \sigma V_x \tag{11}$$

The time delay $\tau$ is quantized for motion picture frames by an amount:

$$\tau = N\tau_1 \tag{12}$$

Where $N = +2, +1, 0, -1, -2$, etc., according to whether the frames are advanced or retarded by one or more frames:

From (11) and (12):

$$R_z = (N\tau_1/b) V_x = (\tau_1/b) NV_x \tag{13}$$

Evaluating (13) for $b = 6.8$ cm $\tau_1 = 1/24$ sec.

$$R_z = 6.13 \times 10^{-3} NV_x \tag{14}$$

EXAMPLE NO. 1

$N = 1$ (1 frame delay)
$V_x = 100$ cm/sec (1 m/sec) image velocity
$R_z = 0.613$
or
$\Delta Z = 0.61 Z$ In (11), the sign of the displacement ratio $R_z$ varies with the direction of velocity $V_x$; at zero velocity the eye sees the object at a median distance. The object moving in one direction appears forward of the median distance; and the object moving in the opposite direction appears rearward of the median distance.

To overcome this difficulty, the successive frames are reversed in editing, as described above. Stationary objects appear to be located on the plane of the screen. Motion thus appears to cause an expansion of the depth sense producing conventional 3-D effects by means of the Time Delay 3-D editing and printing procedure above described.

When viewing a stationary scene in which several people are walking and some are stationary, the motion produces an enhanced feeling of depth. Separation is induced between stationary foreground objects or stationary background objects, in an apparent correct relationship with a moving object between the stationary foreground and background objects. A person or an automobile moving rapidly in the background is seen in correct relationship to a more slowly moving object or person in the foreground. Thus, it appears that the cortex is capable of assimilating various depth cues and providing a total representation of perspective.

Induced Time Delay 3-D can be produced using a scene in which everything is stationary by horizontally panning a conventional monocular camera periodically to the right and left and reversing order of the frames in editing to provide stereo, and to avoid pseudostereo.

From the foregoing it will be seen that there has been provided a stereo converter for standard motion picture projectors which is compact, easy to attach to the projector, and which will produce a 3-dimensional display of a quality and brilliance superior to prior art devices.

We have described an improved viewing and projection system, and a method and device for editing and printing selected time delay 3-D stereo pairs, combining them with conventional 3-D stereo pairs in any order, and projecting and viewing 3-dimensional movies. Modifications of existing equipment is at a minimum, and the editing cost of existing monocular-filmed movies is small. It will be appreciated that the drawings have been purely schematic and that various modifications may be made. For example, considerable latitude is available for the techniques of editing and printing the time delay sequences. Also, if the output of the light source is inherently light-polarized, as in the case of certain lasers employing Brewster-angle internal reflection, then there may be economy in the use of polarizing filters, half-wavelength plates or the like, for effecting polarization shift in one to the exclusion of the other of two split beams from such a source. Coated optics are preferred as a means of assuring greatest efficiency of light transmission. The non-depolarizing screen 49 may be a so-called "high-gain" screen of the "aluminized" or "metallized" variety, i.e., one utilizing glaked metal pigment and having a surface characterized by a high metal-to-polymer ratio. The polarizers for projection and for viewers should preferably be of high transmittance (e.g., in the order of 38% to 40%) and the polarization efficient preferably 99.9% or more; while the transmission should be substantially constant throughout the visible spectrum.

While the dark bar printed directly onto the film to separate stereo pairs is preferred, it is within the purview of this invention to provide a special film gate with a separating strip either horizontally or vertically as the case may be which will perform the same function.

In such instances as it may be desired to show original flat motion pictures without glasses with sequences in 3-D which may be of the time delay and/or conventional 3-D type, this may be readily accomplished as follows:

Referring to FIG. 2, a flat picture, for example, may be used for one of the images such as 62. The other image area 63 is made opaque or black, for example, by over-exposing this area. Also, the blackened area 63 may contain a message, such as "3-D follows, please put on your 3-D viewers", or when the 3-D sequence is to come to an end it will be followed by "please remove your viewers". Thus, it appears that the present system is compatible with any combination of conventional 3-D, time delay 3-D or original flat pictures.

Having thus fully described the invention, what is claimed and sought to be protected by United States Letters Patent is:

1. A device for editing a single strip motion picture film produced by use of a monocular camera for the purpose of creating time delay stereo image pairs printed on single frames of a second single strip motion picture film, said device comprising projecting means for selectively projecting a first frame simultaneously with any one of a selected plurality of frames preceding and succeeding said first frame on said single strip motion picture film so as to form a time delay stereo pair; said projecting means comprising a selectively operable illumination source and a projection lens for each of said plurality of frames and said first frame, switch means for activating the illumination sources for said first and a selected one of said plurality of frames, polarizing means for selectively polarizing the light to any of said frames in a given direction or at 90 degrees to said given direction, and means for marking said first frame and a chosen one of said plurality of frames to form a time delay stereo pair.

* * * * *